(12) United States Patent
Blevins, Jr.

(10) Patent No.: US 8,397,646 B2
(45) Date of Patent: Mar. 19, 2013

(54) RAILROAD TANKER CAR MANWAY COVER SEAL

(75) Inventor: William V. Blevins, Jr., Forest, VA (US)

(73) Assignee: Parker-Hannifin Corp., Cleveland, OH (US)

( * ) Notice: Subject to any disclaimer, the term of this patent is extended or adjusted under 35 U.S.C. 154(b) by 0 days.

(21) Appl. No.: 13/482,049

(22) Filed: May 29, 2012

(65) Prior Publication Data

US 2012/0240815 A1 Sep. 27, 2012

Related U.S. Application Data

(62) Division of application No. 12/752,566, filed on Apr. 1, 2010, now Pat. No. 8,196,523.

(60) Provisional application No. 61/175,486, filed on May 5, 2009.

(51) Int. Cl.
*B61D 39/00* (2006.01)
(52) U.S. Cl. .......... 105/377.08; 105/377.05; 105/377.07
(58) Field of Classification Search ............. 105/377.05, 105/377.07, 377.08
See application file for complete search history.

(56) References Cited

U.S. PATENT DOCUMENTS

| 2,691,352 | A | * | 10/1954 | Bowden | 52/395 |
| 3,499,574 | A | * | 3/1970 | Yates, Jr. | 220/784 |
| 3,618,802 | A | | 11/1971 | Yates, Jr. | |
| 3,664,544 | A | * | 5/1972 | Hammes | 220/320 |
| 3,688,942 | A | | 9/1972 | Mitchell | |
| 3,786,955 | A | * | 1/1974 | Mowatt-Larssen | 220/327 |
| 4,155,571 | A | * | 5/1979 | Gastineau et al. | 285/24 |
| 4,346,903 | A | | 8/1982 | Herimann | |
| 4,443,571 | A | | 4/1984 | Needham | |
| 4,860,919 | A | * | 8/1989 | Weisel et al. | 220/240 |
| 4,915,355 | A | * | 4/1990 | Fort | 251/357 |
| 4,948,185 | A | * | 8/1990 | Miller | 292/256.5 |
| 5,226,662 | A | * | 7/1993 | Justus | 277/592 |
| 5,622,117 | A | * | 4/1997 | Burian et al. | 105/377.07 |
| 5,644,990 | A | * | 7/1997 | Seitz | 105/377.07 |
| 5,678,827 | A | * | 10/1997 | Burian et al. | 277/637 |
| 5,813,352 | A | * | 9/1998 | Bramlett et al. | 105/377.07 |
| 5,960,980 | A | * | 10/1999 | Burke et al. | 220/325 |
| 6,076,471 | A | * | 6/2000 | Burian et al. | 105/377.07 |
| 6,095,365 | A | * | 8/2000 | Yielding | 220/264 |
| 6,494,338 | B1 | * | 12/2002 | Schultz | 220/328 |
| 6,543,787 | B1 | * | 4/2003 | Inciong | 277/593 |
| 7,427,089 | B2 | * | 9/2008 | Silverio et al. | 292/256.5 |
| 7,887,063 | B2 | * | 2/2011 | Rueger et al. | 277/596 |
| 2005/0046121 | A1 | * | 3/2005 | Jones et al. | 277/594 |
| 2005/0121859 | A1 | * | 6/2005 | Seidel et al. | 277/628 |
| 2005/0205576 | A1 | * | 9/2005 | Bednara et al. | 220/328 |

(Continued)

FOREIGN PATENT DOCUMENTS

| EP | 0205312 | 6/1986 |
| JP | 62020971 | 1/1987 |

*Primary Examiner* — Jason C Smith
(74) *Attorney, Agent, or Firm* — John A. Molnar, Jr.

(57) ABSTRACT

A railroad tanker car 10 with a fluid cargo tank 11 and a manway assembly 12 is disclosed. The manway assembly 12 includes a nozzle 17 having a nozzle sealing surface 24 and a cover 18 having a cover sealing surface 33. An attachment device 19 supplies a closing force to bias the cover 18 toward the nozzle 17. A fluid seal 51 prevents egress of fluids from and ingress of contaminants into the tank 11. The seal 51 includes a cover seal member 54, a nozzle seal member 55, and an expander 56 that forces the members 54 and 55 against their respective cover and nozzle sealing surfaces. The fluid seal 51 also includes a compression limiting carrier 52 with integral locating tabs 53 that locates the seal 51 and controls the compression of the elastomeric components of the seal 51.

10 Claims, 4 Drawing Sheets

U.S. PATENT DOCUMENTS

| | | | |
|---|---|---|---|
| 2006/0038357 A1* | 2/2006 | Kamibayashiyama | 277/594 |
| 2007/0235463 A1* | 10/2007 | Wyler | 220/835 |
| 2009/0158959 A1* | 6/2009 | Schultz et al. | 105/377.07 |
| 2010/0282124 A1* | 11/2010 | Blevins, Jr. | 105/377.08 |
| 2011/0101626 A1* | 5/2011 | Prehn et al. | 277/592 |
| 2011/0107940 A1* | 5/2011 | Borowski et al. | 105/377.05 |

* cited by examiner

RAILROAD TANKER CAR MANWAY COVER SEAL

CROSS REFERENCE TO RELATED APPLICATIONS

The present application is a divisional application of U.S. patent application Ser. No. 12/752,566, filed Apr. 1, 2010 now U.S. Pat. No. 8,196,523 which claims the benefit of the filing date of U.S. Provisional Patent Application Ser. No. 61/175, 486, filed May 5, 2009, the disclosures of which are incorporated herein by reference in their entirety.

TECHNICAL FIELD

This invention relates generally to railroad tanker car manway assemblies, and more specifically to seals for such assemblies.

BACKGROUND OF THE INVENTION

Railroad tanker cars transport numerous types of fluid cargo. Such tanker cars may include a tank for carrying the fluid cargo and a manway assembly for providing access to the interior of the tank for filling or other purposes. Railroad tanker car manway assemblies of this type may include a nozzle located on the top of the tank for providing access to the tank and a cover for closing the nozzle after filling and during storage and transportation of the tanker car.

A seal may be provided between the nozzle and the cover of the manway assembly to prevent egress of the fluid cargo from the tank and to prevent ingress of dirt and water and other contaminants into the tank. Such seals may be exposed to variations in the chemical composition and physical properties of various fluid cargos. Such seals may also be exposed to variations in mechanical forces during opening and filling through and closing the manway assembly, variations in ambient weather conditions of temperature, wind and moisture, and variations in the pressure differential between the inside and the outside of the tank. During such conditions, the integrity of the manway assembly seal should be maintained and the seal should not leak or otherwise fail.

Railroad tanker car manway assembly seals may be replaced on condition due to leakage or mechanical damage, or may be replaced at appropriate maintenance intervals of time and/or number of open and close cycles of the manway assembly. Seals that have a longer service life interval between replacements and seals that may be replaced with less time are desirable.

SUMMARY OF THE INVENTION

This invention provides a railroad tanker car manway assembly and a fluid seal for such assembly. The invention further provides a method of manufacturing the seal.

The manway assembly includes a nozzle, a cover, and an attachment device that secures the cover to the nozzle and applies a closing force to bias the cover toward the nozzle. The fluid seal is disposed between the nozzle and the cover, and the closing force is applied against opposite sides of the seal by the cover and the nozzle. A compression limiting carrier of the fluid seal provides a substantially incompressible spacer that defines a constant and controlled distance between opposing sealing surfaces of the nozzle and the cover when the attachment device is fully tightened.

The nozzle is a generally round hollow cylinder that is permanently secured to the top of the tank of the tanker car. The nozzle provides access to the interior of the tank and includes an inner cylindrical surface, an outer cylindrical surface, and a generally planar annular top nozzle sealing surface.

The cover is generally flat and round and includes an outwardly facing top surface and an inwardly facing bottom surface. A generally planar cover sealing surface is disposed on the bottom surface of the cover and is aligned with the nozzle sealing surface.

The fluid seal includes a high compressive strength metallic compression limiting carrier. The carrier includes a ring shaped carrier portion having a top compression limiting surface that engages the bottom sealing surface of the cover, a bottom compression limiting surface that engages the top sealing surface of the nozzle, and axially projecting tab portions that cooperatively engage the nozzle to radially locate the ring shaped carrier portion relative to the top and bottom sealing surfaces.

The fluid seal further includes axially spaced apart top and bottom thermoplastic elastomeric seal members. Each seal member includes a convex seal surface, and the axial distance between the seal surfaces is greater than the axial distance between the top and bottom compression limiting surfaces of the ring shaped carrier. The top convex seal surface engages and seals against the sealing surface of the cover, and the bottom convex sealing surface engages and seals against the sealing surface of the nozzle.

The fluid seal further includes a thermosetting elastomeric expander member secured to the ring shaped carrier and disposed between the top and bottom seal members. As the attachment device is tightened during closing of the cover of the manway assembly, the compression limiting carrier defines and controls the minimum axial distance between the opposing sealing surfaces of the cover and nozzle and defines the maximum compression of the thermoplastic seal surfaces and of the thermosetting expander. The expander locates and secures the top and bottom seal members relative to the ring shaped carrier portion. The expander also provides a controlled axial force against the top and bottom seal members to bias such seal members against their respective sealing surfaces on the cover and nozzle when the attachment device is fully tightened.

The method of manufacturing the fluid seal includes stamping or cutting or otherwise forming a carrier portion. The carrier portion is formed with tab portions as an integral component in which the tab portions are formed in a coplanar alignment relative to the carrier portion. The carrier portion is placed in a mold, and a top thermoplastic seal blank and a bottom thermoplastic seal blank and an elastomeric thermosetting expander blank are preloaded into the mold with an elastomer bonding agent applied between the expander blank and each of the seal blanks. The metallic carrier portion is assembled to the mold, and one peripheral surface of the metallic carrier portion provides one surface of the mold. An elastomer bonding agent is applied between the peripheral surface of the carrier portion and the seals and expander. The mold is closed, with heat applied to vulcanize the elastomeric expander and chemically and mechanically bond the carrier portion and the top and bottom seals and the expander into a unitary compression limiting seal. The tabs are displaced to a substantially perpendicular alignment relative to the carrier portion, either before or during or after the molding process is completed.

The invention also provides various ones of the additional features and structures and methods described in the claims set out below, alone and in combination, which claims are incorporated by reference in this summary of the invention.

BRIEF DESCRIPTION OF THE DRAWINGS

Embodiments of this invention will now be described in further detail with reference to the accompanying drawings, in which.

DETAILED DESCRIPTION OF THE INVENTION

The principles, embodiments and operation of the present invention are shown in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

Figure 1:
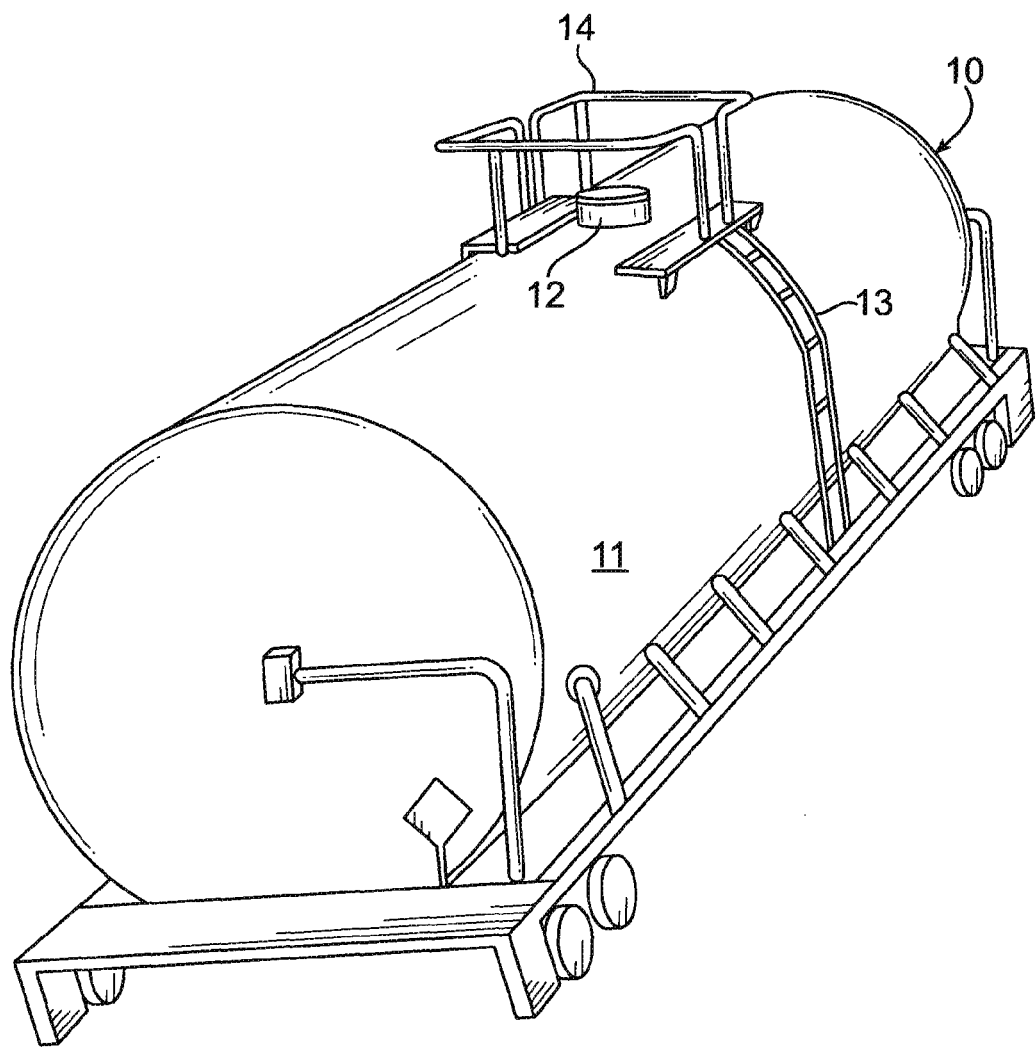
FIG. 1 is a perspective view of a railroad tanker car having a manway assembly according to a preferred embodiment, incorporating certain principles of this invention.

FIG. 1 illustrates a railroad tanker car 10 having a cargo tank 11, a manway assembly 12, manway access stairs 13, and a manway safety railing 14. The cargo tank 11 receives, stores, transports and dispenses a variety of fluids having a wide range of chemical compositions and physical properties. In the illustrated embodiments of the invention, the cargo tank 11 may be filled with liquid cargo.

Figure 2:
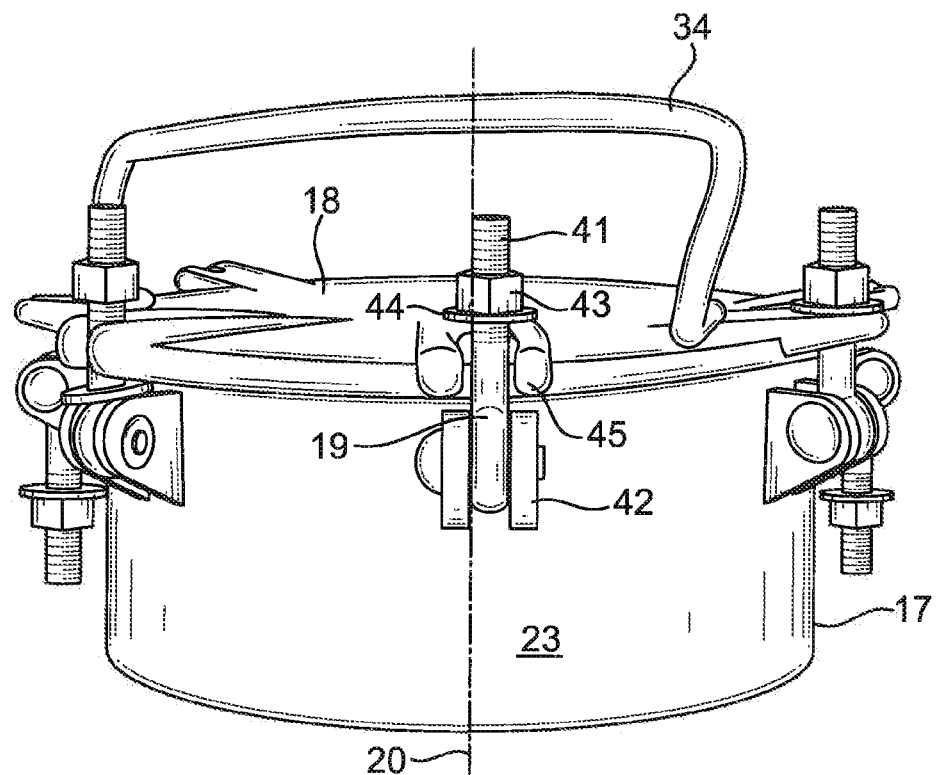
FIG. 2 is an enlarged perspective view of the manway assembly, removed from the top of the railroad tanker car in FIG. 1.

Referring to FIG. 2, the manway assembly 12 includes a nozzle 17, a cover 18, and an attachment device 19, all of appropriate ferrous material and all disposed and centered along a longitudinal axis 20. FIG. 2 illustrates one of several available designs for the nozzle 17, cover 18 and attachment device 19, and other designs for these components may alternatively be used without departing from the scope or principles of this invention. The materials, design, maintenance, testing and operation of the nozzle 17, cover 18 and attachment device 19 may, for example, be according to various options for such components set out in the Association of American Railroads ("AAR") Manual of Standards and Recommended Practices Specifications for Tank Cars, including appendix D to such Specifications, available at 425 Third Street S.W., Washington, D.C. 20024 (www.aar.org) the entirety of such Manual being incorporated herein by reference.

Figure 4:
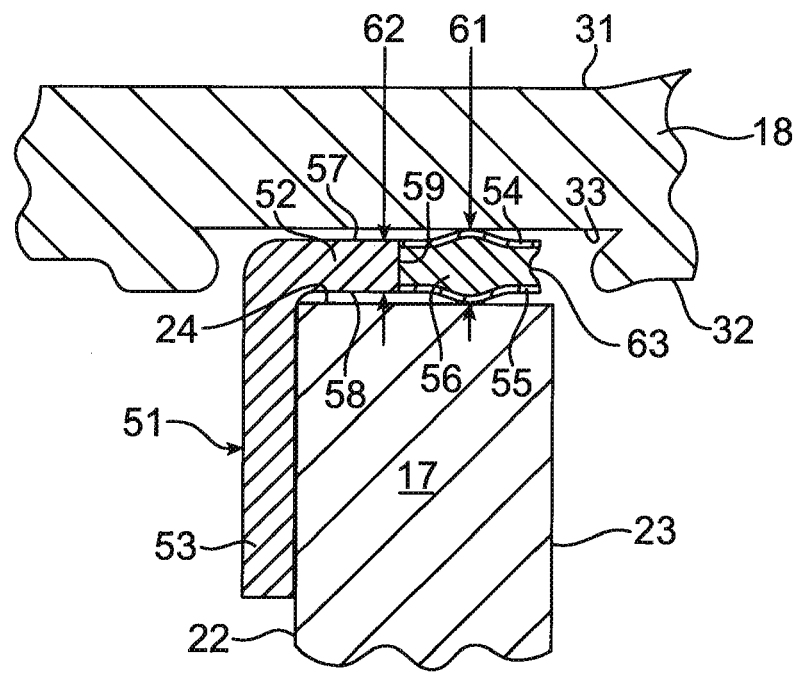
FIG. 4 is an enlarged cross sectional view of a portion of the manway assembly shown in FIG. 2, showing the manway assembly and fluid seal prior to tightening the manway assembly.

The nozzle 17 illustrated in FIG. 2 is a generally round annular cylinder that is welded to the top of the cargo tank 11 in alignment with a corresponding access hole (not shown) in the top of the tank 11. The welded joint between the nozzle 17 and the tank 11 provides a permanent and fluid tight connection therebetween. The nozzle 17, as shown in FIGS. 2 and 4, includes a generally cylindrical interior surface 22, a generally cylindrical exterior surface 23, and a generally flat, planar, smooth, annular top sealing surface 24. The nozzle 17 provides access to the interior of the cargo tank 11, for filling the tank 11 and other purposes.

As further shown in FIGS. 2 and 4, the cover 18 is generally flat and round and includes a generally flat round top surface 31 and a generally flat round bottom surface 32. A generally flat, planar, smooth, annular bottom annular sealing surface 33 is machined in the bottom surface 32. The bottom sealing surface 33 and the top sealing surface 24 are longitudinally aligned (longitudinally opposed), as shown in FIG. 4. A cover handle 34 is secured to the cover 18. The cover 18 may be secured to the nozzle 17 by an appropriate hinge (not shown), so that the cover 18 can be rotatably opened and closed relative to the nozzle 17 by lifting on the cover handle 34, to open and close access to the interior of the cargo tank 11 through the nozzle 17.

Referring to FIG. 2, the attachment device 19 includes a plurality of bolts 41, only some of which can be seen in FIG. 2. One end of each bolt 41 is pivotally secured to stationary lugs 42 located on the exterior surface 23 of the nozzle 17 by a suitable pivot pin. The other end of each bolt 41 is threaded and receives a suitable nut 43 and washer 44, so that such other end may be secured to lugs 45 located on the cover 18. The bolts 41 may be loosened to allow such other end to pivot away from the lugs 45 on the cover 18 to permit opening the cover 17, and the bolts may be tightened when such other end is aligned with the lugs 45 to tighten the cover 18 against the nozzle 17.

Figure 3:
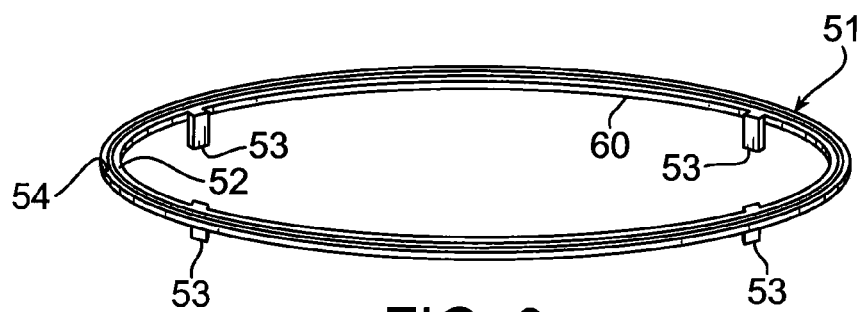
FIG. 3 is an enlarged perspective view of the fluid seal used in the manway assembly shown in FIG. 2.

Referring now to FIGS. 3 and 4 together, a fluid seal 51 includes a compression limiting carrier 52, locating tabs 53 integral with the carrier 52, a top cover seal member 54, a bottom nozzle seal member 55, and an expander 56. The compression limiting carrier 52 is of a high compressive strength metallic material. In the preferred embodiment, the carrier 52 is of United States Society of Automotive Engineers 304 stainless steel material. Alternatively, for some applications other high compressive strength materials including high strength plastic and carbon composites may be used for the carrier 52 and integral tabs 53. The carrier 52 is generally flat, annular and ring shaped, with a top compression limiting surface 57, a bottom compression limiting surface 58, and peripheral surfaces 59 and 60. The surfaces 57 and 58 of the carrier 52, and the sealing surfaces 33 and 24 of the cover 18 and nozzle 17, respectively, are all centered along the longitudinal axis 20 and are all disposed in planes that are generally perpendicular to the longitudinal axis 20. At least three and preferably four locating tabs 53 are provided along and depend from one peripheral surface 60, to align the fluid seal 51 radially along the axis 20 in alignment with the cover sealing surface 33 and the nozzle sealing surface 24 when the cover 18 is partially or fully opened, and to prevent the fluid seal 51 from unintentionally falling into the cargo tank 11 or otherwise moving from its position on the nozzle 17.

The top or cover seal member 54 and the bottom or nozzle seal member 55 are each of a chemical resistant, thin, low temperature thermoplastic fluoroelastomer material from the polytetrafluoroethylene family of materials. The longitudinal thickness of each seal member 54 and 55 is in the range 0.005 inches to 0.040 inches, to provide adequate resistance to chemical or mechanical degradation while providing adequate flexibility. In the preferred embodiment, this material is available commercially under the brand name Dyneon. The surface of the seal member 54 that is arranged to engage and seal against the cover sealing surface 33 as shown in FIG. 4, and the surface of the seal member 55 that is arranged to engage and seal against the nozzle sealing surface 24 as shown in FIG. 2, each include smooth outwardly convex surfaces for maximum sealing performance. The longitudinal distance 61 between the outwardly convex sealing surfaces of the seal members 54 and 55 is greater than the longitudinal thickness 62 of the carrier 52. The surfaces of the seal members 54 and 55 that are arranged adjacent the expander 56 are chemically etched for maximum bonding to the expander 56.

The expander 56 is located between the cover seal member 54 and the nozzle seal member 55. The expander 56 substantially entirely fills the volume defined between the seal members 54 and 55 and the carrier peripheral surface 59, except that a concave void 63 extends around the entire peripheral extent of a radially outwardly facing surface of the expander 56 to prevent the expander material from being over compressed when the attachment device 19 is fully tightened The expander 56 is of a low temperature thermosetting elastomeric polymeric material such as natural or synthetic rubber and is preferably an elastomeric material according to American Society of Testing Materials D2000. The expander 56 includes longitudinally oppositely facing expander surfaces that are bonded to the adjacent surfaces of the seal members 54 and 55. The radially outwardly facing peripheral surface in which the concave void 63 is provided and a radially inwardly facing peripheral surface of the expander 56 extend longitudinally between the oppositely facing expander surfaces, with the radially inwardly facing peripheral surface of the expander 56 being bonded to a peripheral surface, such as surface 59, of the carrier 52. In these bonding areas, a heat activated bonding agent such as the bonding agent available under the trade name Chemlok is used. The seal members 54 and 55 and the expander 56 together provide an elastomeric seal element 54, 55, 56 for the fluid seal 51.

Referring again to FIG. 4, the seal 51 is illustrated installed in position between the cover 18 and the nozzle 17, with the cover 18 almost fully closed but before any compression of the elastomeric element of the seal 51 has occurred. In this position, the cover sealing surface 33 and the nozzle sealing surface 24 initially engage the longitudinally thickest portion of the elastomeric element 54, 55, 56 of the fluid seal 51. This longitudinally thickest portion is the location at which convex seal members 54 and 55 are in an at rest uncompressed state and are longitudinally spaced apart a maximum distance 61 which, as described above, is greater than the longitudinal thickness 62 of the compression limiting carrier 52. In this position, the attachment device 19 is not yet fully tightened but the nuts 43 and washers 44 of each bolt 41 may be loosely aligned with the associated cover lugs 45.

Figure 5:
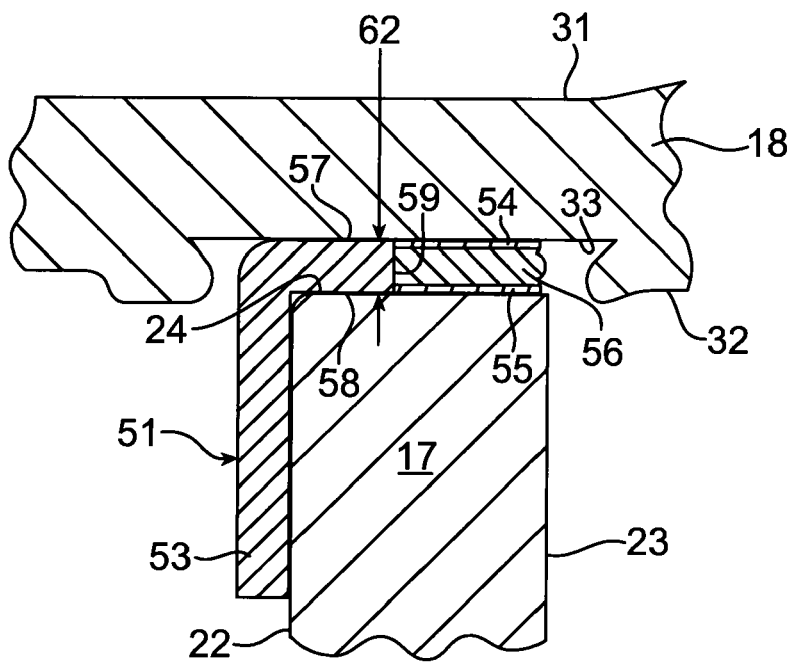
FIG. 5 is a view similar to FIG. 4, showing the manway assembly and fluid seal in a fully tightened position.

When the nuts 43 associated with each of the bolts 41 are fully tightened, the cover 18 and nozzle 19 and fluid seal 51 move to the positions illustrated in FIG. 5. In this position, the cover 18 and nozzle 17 each tightly engage the top and bottom compression limiting surfaces 57 and 58, respectively, of the compression limiting carrier 52. This position causes the torque required to further tighten the nuts 43 to increase significantly, to signal that the nuts are fully tightened and that the compression limiting carrier 52 is tightly compressed between the cover 18 and the nozzle 17 but is not substantially longitudinally deformed by such compression. As this occurs, the cover sealing surface 33 moves closer to the nozzle sealing surface 24, until the minimum distance 62 between these surfaces as determined and controlled by the carrier 52 is reached as illustrated in FIG. 5. In this position, the cover seal member 54 is longitudinally compressed against the surface 33 and the nozzle seal member 55 is longitudinally compressed against the surface 24. The amount of this compression is determined by the difference between the distances 61 and 62. The sealing force exerted by the seal members 54 and 55 against their respective sealing surfaces 33 and 24 is determined primarily by the compressive force exerted against these members by the compression of the expander 56, and is determined to a minor extent by the elastic memory of the seal members 54 and 55 as they are displaced from their at rest concave positions shown in FIG. 4 to their energized generally flat positions shown in FIG. 5. The volume of the expander 56 is squeezed longitudinally and is displaced radially from the position shown in FIG. 4 to the position shown in FIG. 5. In this manner, the displacement of the cover seal member 54 and of the nozzle seal member 55 are determined and controlled by the compression limiting carrier 52, and the sealing force of each of the seal members 54 and 55 is provided by and determined by the expander 56 that resists this displacement. The expander 56 has a relatively low compression set, so that the seal force is repeatable time after time to increase the service life of the fluid seal 51. While the seal members 54 and 55 exert a relatively strong sealing force against their respective sealing surfaces 33 and 24, the specific material used for the seal members 54 and 55 may reduce any tendency of the seal members to stick to such sealing surfaces or any tendency to damage the seal members or the expander even after the cover 18 has been closed for a long period of time under adverse ambient weather conditions.

Figure 6:
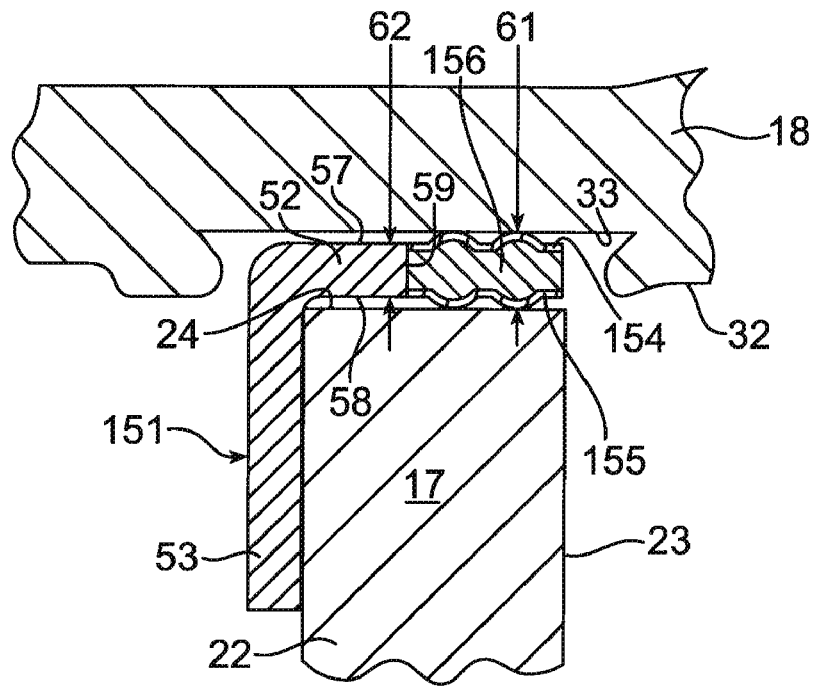
FIG. 6 is a view similar to FIG. 4, showing another embodiment of the fluid seal according to the present invention.

FIG. 6 illustrates an alternative preferred embodiment of this invention. In FIG. 6, components that are identical to those shown in FIGS. 1 through 5 are indicated with the same reference numbers as those used in FIGS. 1 through 5 while components that are functionally similar but not structurally identical are indicated by the reference number used in FIGS. 1 through 5 with a "1" prefix. As shown in FIG. 6, the cover seal member 154 and the nozzle seal member 155 each include two concentric outwardly convex sealing ridges instead of the single convex ridge configuration for the seal members 54 and 55 shown in FIGS. 1 through 5. Other alternative embodiments of the invention are also contemplated. For example, the integral tabs 53 may be disposed on the outer periphery of the carrier 52 to cooperate with the exterior cylindrical surface 23 of the nozzle 17 to locate the fluid seal while the elastomeric element 54, 55,56 may be located on the inner periphery of the carrier 52. Additionally, one or both peripheral edge surfaces of the expander 56, one of which is uncovered in the embodiments described above and the other of which is bonded to the surface 59 of the carrier 52, may be partially of fully covered by a flexible film of the same or similar material as that used for the seal members 54 and 55, but preferably of a thinner cross section. Still further, the fluid seal 51 may be used in different joint configurations and applications, and variations in size and proportion for the various components of the fluid seal may be incorporated to accommodate the specific joint in which the fluid seal is used.

The structure of the fluid seal 51 and its various embodiments shown in the drawings and described above may minimize or reduce chemical and physical damage to the components of the fluid seal 51 during opening and filling through and closing the components in which the fluid seal 51 is used. Additionally, over compression or under compression of the seal members 54 and 55 and expander 56 may be minimized or reduced or eliminated. This may increase the length of service of the fluid seal 51 between required replacements. Additionally, time and complexity of such replacement may be minimized.

Figure 7:
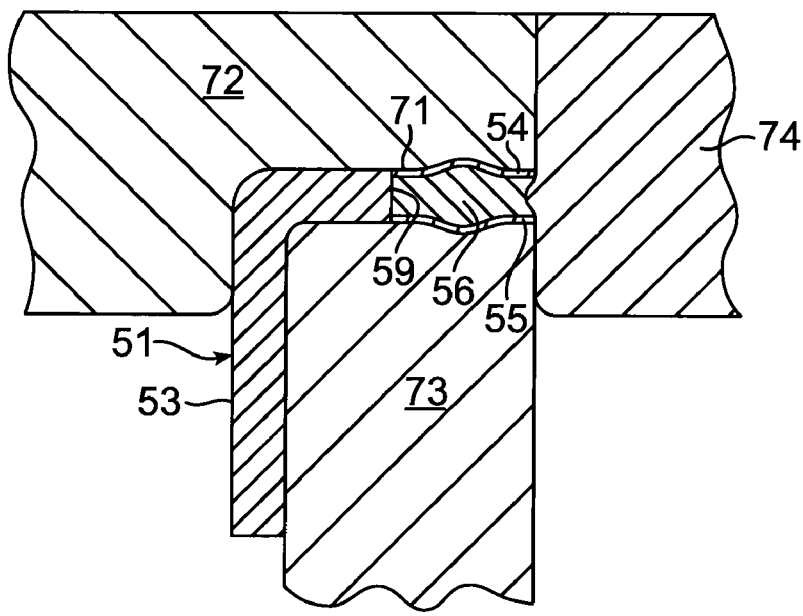
FIG. 7 is a cross sectional view illustrating the molding step according to the method of the present invention, after vulcanization.

The method of manufacturing the fluid seal 51 includes stamping or cutting or casting or otherwise forming at least one generally round carrier portion. The carrier portion may extend for a full 360 degree circumference, or it may be formed in partial segments that extend for less than 360 degrees and that are later secured together. The carrier portion is formed with one or more locating tab portions as an integral member, with the tab portions formed in a coplanar alignment relative to the carrier portion. As shown in FIG. 7, the formed carrier portion 52 with the integral locating tabs 53 is placed in a mold apparatus that may include a mold cavity 71 defined by a top mold segment 72, a bottom mold segment 73, a side mold segment 74, and the peripheral surface 59 of the carrier 52. FIG. 7 illustrates the mold cavity 71 in its closed position, but the carrier portion 52 is placed in the mold cavity 71 when the mold cavity 71 is opened such as by displacing the top mold segment 72 away from the mold segments 73 and 74. A nozzle seal member blank in the form of a generally flat annulus or in the form of a slightly concave annulus is placed on the mold segment 73, a circular rope segment like expander blank is placed on the nozzle seal member blank, and a cover seal member blank in the form of a generally flat annulus or in the form of a slightly concave annulus is placed on the expander blank. The bonding agent is also applied between each of the seal members and the expander, and also between the carrier peripheral surface 59 and the expander and seal members. The mold cavity 71 is then closed to the position shown in FIG. 7 and heated, to shape and vulcanize the expander 56 and to shape the seal members 54 and 55. The integral tabs 53 may be displaced from their original formed position generally coplanar with the carrier 52 before the molding step or during the molding step when the mold shown in FIG. 7 is used, or they may be so displaced after the molding step, to complete the manufacture of the fluid seal 51.

Presently preferred embodiments of the invention are shown in the drawings and described in detail above. The invention is not, however, limited to these specific embodiments. Various changes and modifications can be made to this invention without departing from its teachings, and the scope of this invention is defined by the claims set out below.

What is claimed is:

1. A seal comprising:
    a compression limiting carrier, said carrier being annular and being of rigid relatively incompressible material, said carrier having longitudinally spaced apart, radially aligned, oppositely facing compression limiting surfaces, said carrier having generally concentric, radially spaced apart, circular, ring like inner and outer peripheral surfaces extending longitudinally between said compression limiting surfaces;
    an elastomeric thermosetting expander of generally annular configuration, said expander having longitudinally spaced apart, radially aligned, oppositely facing expander surfaces, the longitudinal distance between at least a portion of said expander surfaces of said expander being greater than the longitudinal distance between said compression limiting surfaces of said carrier when said expander is in an at rest position, said expander having inner and outer peripheral surfaces extending longitudinally between said expander surfaces, one of said peripheral surfaces of said expander being bonded to one of said peripheral surfaces of said carrier, the volume defined by said peripheral surfaces and said expander surfaces of said expander being substantially filled by the material of said expander;
    first and second longitudinally spaced apart seal members, said seal members each being annular and of thermoplastic fluoroelastomer material, said seal members each being bonded to one of said expander surfaces of said expander, said seal members being spaced apart by a longitudinal distance substantially greater than the longitudinal distance between said compression limiting surfaces of said carrier when said seal members are in an at rest position.

2. A seal as set forth in claim 1, including a plurality of locating tabs extending longitudinally from the other one of said peripheral surfaces of said carrier.

3. A seal as set forth in claim 2, wherein at least a portion of said carrier and said tabs are of integral construction.

4. A seal as set forth in claim 1, wherein said inner peripheral surface of said expander is bonded to said outer peripheral surface of said carrier.

5. A seal as set forth in claim 4, wherein each of said seal members includes a convex portion, said convex portions of said seal members are longitudinally opposite one another, and the location of greatest longitudinal distance between said seal members is at the location of said convex portion.

6. A seal as set forth in claim 1, including a tanker car manway assembly having a nozzle and a cover;
    said nozzle being generally cylindrical and having a longitudinally extending generally cylindrical inner peripheral surface, a longitudinally extending generally cylindrical outer peripheral surface, and a radially extending sealing surface;
    said cover including a radially extending sealing surface generally opposite and spaced apart from said nozzle sealing surface;
    and said seal being disposed between said nozzle and said cover, one of said compression limiting surfaces of said carrier engaging said nozzle and the other of said compression limiting surfaces of said carrier engaging said cover to limit and control the minimum distance between said nozzle sealing surface and said cover sealing surface when said cover and said nozzle are in a fully assembled position, one of said sealing members sealingly engaging said nozzle sealing surface with a longitudinal sealing force resulting from compression of said expander when said cover and said nozzle are in a fully assembled position, the other of said sealing members sealingly engaging said cover sealing surface with a longitudinal sealing force resulting from compression of said expander when said cover and said nozzle are in a fully assembled position.

7. A seal as set forth in claim 6, wherein said one compression limiting surface of said carrier and one seal member both engage said cover sealing surface, said other compression limiting surface of said carrier and said other seal member both engage said nozzle sealing surface, and the longitudinal distance between said seal members is substantially equal to the longitudinal distance between said compression limiting surfaces when said cover and said nozzle are in a fully assembled position.

8. A seal as set forth in claim 6, wherein said inner peripheral surface of said expander is bonded to said outer peripheral surface of said carrier.

9. A seal as set forth in claim 8, wherein each of said seal members includes a convex portion, said convex portions of said seal members are longitudinally opposite one another, and the location of greatest longitudinal distance between said seal members is at the location of said convex portion when said when said seal members are in an at rest position.

10. A method of manufacturing a seal comprising the steps of:
    stamping or cutting or casting or otherwise forming a rigid one piece integral carrier member with a carrier portion and at least one locating tab substantially coplanar with said carrier portion;

placing the integral carrier member into a thermosetting elastomer mold with the carrier member providing one wall of the mold;

inserting a longitudinally layered configuration of thermosetting and thermoplastic materials into the mold;

closing the mold;

vulcanizing the thermosetting material and bonding the carrier member and thermosetting and thermoplastic materials together; and displacing the tab portions to a position substantially perpendicular to the carrier portion after said forming step.

* * * * *